Figure 1:
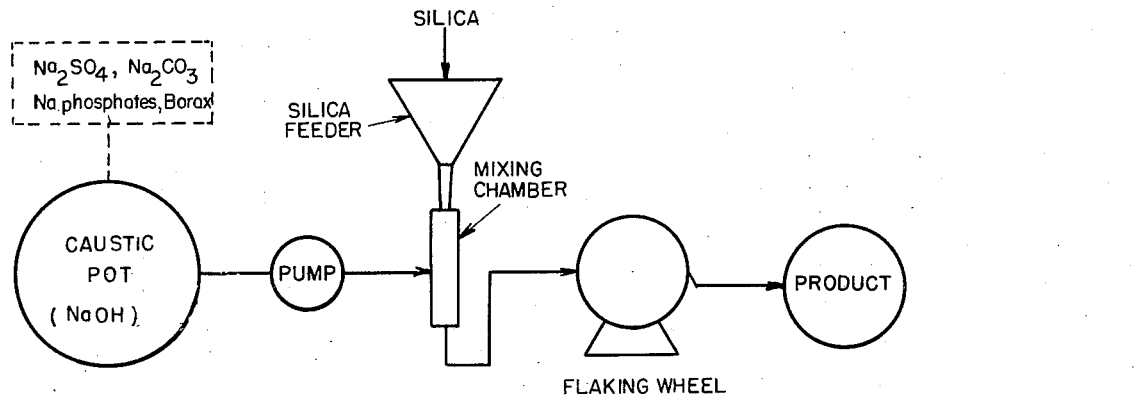

Sept. 5, 1944.    B. K. BEECHER ET AL    2,357,723
MANUFACTURE OF SILICATED CAUSTIC ALKALI PRODUCTS
Filed Sept. 15, 1941

INVENTORS
BRAZIER K. BEECHER and
HOWARD F. RODERICK
BY
Oberlin, Limbach + Day
ATTORNEYS Patented Sept. 5, 1944

2,357,723

UNITED STATES PATENT OFFICE 2,357,723

MANUFACTURE OF SILICATED CAUSTIC ALKALI PRODUCTS

Brazier K. Beecher, Wyandotte, and Howard F. Roderick, Grosse Ile, Mich., assignor, by mesne assignments, to Wyandotte Chemicals Corporation, Wyandotte, Mich., a corporation of Michigan Application September 15, 1941, Serial No. 410,844

7 Claims. (Cl. 23—110)

The present invention relating, as indicated, to the manufacture of silicated caustic alkali products, has particular reference to a novel method for forming an alkali silicate in a composition consisting chiefly of an alkali metal hydroxide such as sodium or potassium hydroxide. The products resulting from our present invention are well adapted for use in the field of detergents of relatively high alkalinity, and in which it is desired to have present the cleaning effect of an alkali metal silicate compound.

The principle of the present invention is particularly well suited for the manufacture of detergent compositions capable of controlling foam generation in washing solutions, such as embodied in the co-pending application of Eugene F. Hill, Ser. No. 398,939 filed June 20, 1941. Such foam controlling detergent compounds, as set forth in this co-pending application consist essentially of caustic alkali as the major constituent together with minor proportions of the silicates and the sulphate of the alkali metal. Our invention is also suited for the production of other caustic alkali products or compositions in which alkali metal salts, in addition to the silicates, may or may not be present.

It is well known that caustic alkalis such as caustic soda, react with silica in accordance with the following chemical formula:

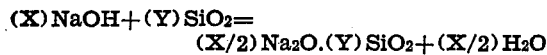

$$(X)NaOH + (Y)SiO_2 = (X/2)Na_2O \cdot (Y)SiO_2 + (X/2)H_2O$$

The above reaction will occur to some extent between the caustic soda and the silica even if they are in contact in the solid form with each other, and at atmospheric temperatures. Heating of the reactants, of course, speeds the reaction. Employment of heating temperatures in the range of the melting point of the caustic soda, viz., at a temperature where the caustic soda is in liquid form, together with a mechanical working or stirring of the ingredients, has been well known as an expedient for hastening the reaction. However, the reaction products, i. e., the sodium silicate having the general formula $XNa_2O \cdot YSiO_2$ possesses a melting point considerably in excess of that of the caustic soda, with result that the silicate reaction product not only forms as a solid precipitate, but occurs as a semi-plastic, gummy cementitious mass requiring a substantial amount of mechanical working in the presence of heat (either heat of the exothermic reaction, or externally applied heat, or both) in order to be reduced to a sufficiently crumbled and disintegrated form, so that it is acceptable for purposes of packaging, handling, dissolution and/or phyiscal mixture with other materials.

Furthermore, the physical nature of this sodium silicate reaction product, in addition to the time and expense required to reduce it to the acceptable form, results in quite extensive wear and deterioration upon the mechanical working machinery, so that there occurs an economical loss in the upkeep and replacement of the latter.

We have discovered however that where minor proportions of silica are introduced to the caustic alkali (usually caustic soda, due to predominant availability of the latter in this country), and where the amount of silica is 1-3 per cent by weight that the above-mentioned difficulties and disadvantages can be overcome. The treatment of caustic alkali with silica, according to the teachings of our invention, results not only in a substantial economic saving, but greatly increases the rate of production. Briefly outlined, our invention involves the heating of the caustic soda to a temperature substantially above its melting point, transferring it while in fluid form to a cooling surface where the product is solidified in flaked or sheet-like form, and during such transfer, dissolving in the caustic alkali the said minor proportion of silica, all with such rapidity and within such a short space of time, that the latent or sensible heat of the caustic is sufficient to retain it at a temperature above the melting point of the silicated caustic final product and an alkali silicate reaction product does not have an opportunity to precipitate or separately to solidify out from the fluid vehicle before cooling and solidification of the silicated caustic product as a whole.

To the accomplishment of the foregoing and related ends, said invention then consists of the steps and the product of manufacture hereinafter fully described and particularly pointed out in the claims.

The annexed drawing and the following description set forth in detail one approved method of carrying out the invention. Such disclosed method, however, constituting one of various ways in which the principle of the invention may be used.

Figure 2:
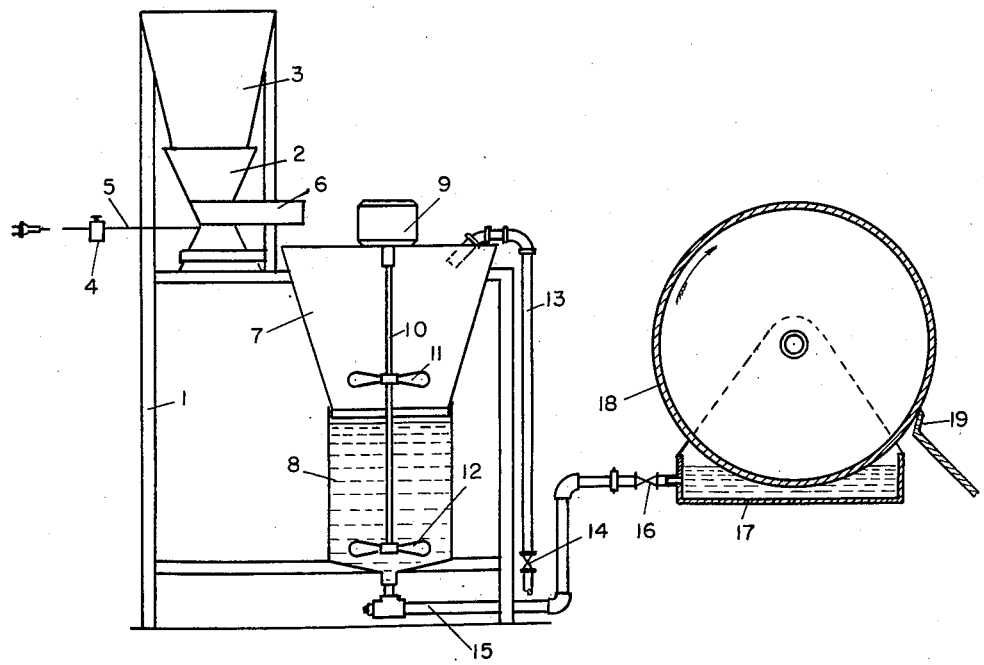

In said annexed drawing:

Fig. 1 is a flow sheet illustrative of the steps involved in the manufacturing process of the invention; and Fig. 2 is an elevational view of a form of apparatus suitable for use in such manufacturing process.

Referring first particularly to Fig. 1 of the drawing, the procedural steps of our process are therein illustrated. First, a quantity of molten caustic soda is provided in the caustic pot which may be the usual pot in which caustic soda is reduced to its dehydrated form. Anhydrous sodium hydroxide has a melting point of 318° C. The temperature in the caustic pot, however, is raised to 390° C. or above, viz., in the range of 390° to 400° C. This temperature imparts sufficient sensible heat to the caustic soda to maintain it in a fluid state throughout the remaining steps of the process, and up to the point where solidification is desired, as shall be subsequently pointed out.

The molten caustic soda is withdrawn from the caustic pot by means of the pump whence it is caused to flow through the mixing chamber and then to the flaking wheel. As the molten caustic soda flows through the mixing chamber, a measured quantity of finely divided, solid silica, such as silica flour, powdered quartz, rock crystal or the like, is entrained therein. Within not over approximately one minute of time between the initial contact of the solid silica with the molten caustic, viz., between the mixing chamber and the flaking wheel, a reaction occurs wherein the silica becomes dissolved in the caustic soda vehicle in the form of a sodium silicate. Then as the caustic soda vehicle and the sodium silicate reaction product are both introduced as a fluid body to the flaking wheel, such body being distributed in a relatively thin layer on the cooled surface of the flaking wheel, it becomes solidified; whence it is removed in the form of the resultant silicated caustic product. Such product is composed of a multiplicity of plate-like or sheet-like particles which may be packaged, shipped and used in such form; or may be further ground to a greater stage of comminution, if desired.

Where it is desired to manufacture a caustic alkali product in which minor proportions of other alkali salts, such as sodium sulphate, sodium carbonate, borax and one or more of the sodium phosphates are incorporated, these latter salts are added to the molten caustic soda in the caustic pot. These salts are capable of entering into solution in the molten caustic and they do not form any precipitated reaction product.

Thus for example, where it is desired to manufacture a foam controlling detergent product, such as disclosed in the aforesaid co-pending Hill application Ser. No. 398,939, the required 2-6% by weight of sodium sulphate or salt cake is first introduced to the caustic pot. Then the silica, introduced by way of the silica feeder into the flowing, molten caustic soda vehicle, is so proportioned as to entrain 1-3% by weight of the silica therein.

The above described process is well suited to the making of a silicated caustic alkali product in which the weight of silica to the total weight is 1-3 per cent. The time of contact of the solid silica with the molten caustic soda is quite critical and important. Regardless of the temperature of the molten caustic, a reaction product precipitate will form on standing and in excess of periods of approximately one minute of time. Such a precipitated reaction product is of such a physical nature as to be very difficult to handle or to treat with chemical manufacturing equipment. Possibly such precipitate which forms on standing is a complex secondary reaction product or products formed by the reaction of the initially produced sodium silicate compound which in turn reacts with an additional amount of the sodium hydroxide. In any event, by so controlling the rate of flow of the molten caustic soda from the mixing chamber to the flaking wheel, the rate of addition of the silica from the silica feeder, and accordingly the time of contact of the silica with the molten caustic soda to a period of approximately one minute or less, the formation of such a precipitated reaction product is avoided.

In Fig. 2 there is shown an apparatus suitable for performing the above described process. Such apparatus comprises a supporting frame 1 on the top of which is mounted the silica feeder 2, with the hopper 3 leading into it. A variable rheostat 4 is provided in the electric power line 5 leading to the operating mechanism of the silica feeder 2. The delivery outlet 6 of the silica feeder is positioned above the top of the hopper 7 leading to the mixing chamber 8. An electric drive motor 9 is positioned on top of the hopper 7 and adapted to rotate the shaft 10 upon which the mixing paddles 11 and 12 are mounted.

The mixing chamber 8 is preferably composed of a caustic resistant material such as nickel.

The conduit 12 has a variable control valve 14 connecting therein leading from the caustic pump and is adapted to discharge into the hopper 7. A second conduit 15 leads from the bottom of the mixing chamber 8 to the pan 17 of the flaker wheel 18.

The rate of flow of the molten caustic soda into the mixing chamber 8 and thence to the flaker pan 17, can thus be regulated by means of the valves 14 and 16. The rate of operation of the silica feeder 2, and hence the rate of feed of the silica entrained in the molten caustic, can be controlled by the setting of the rheostat 4.

A scraper blade 19 is provided in contact with the cylindrical surface of the flaker wheel 18 and functions to remove the solidified product therefrom.

Other modes of applying the principle of the invention may be employed, change being made as regards the details described, provided the features stated in any of the following claims or the equivalent of such be employed.

We therefore particularly point out and distinctly claim as our invention:

1. The method of making silicated caustic alkali products, consisting in the steps of heating a quantity of caustic alkali to a temperature substantially above its melting point, and adding finely divided, solid silica to said molten caustic alkali in the amount of 1-3 per cent by weight of silica, the temperature of said molten caustic alkali prior to said silica addition being capable of imparting sufficient sensible heat, together with the heat of the caustic alkali-silica reaction to maintain the temperature of the reaction product at or above its melting point, and then quickly solidifying the resultant fluid product in its entirety by rapidly cooling it in thin cross-section and before separate precipitation of any caustic alkali-silica reaction product.

2. The method of making silicated caustic alkali products, consisting in the steps of heating anhydrous caustic soda to a temperature of at least 390° C., adding finely divided, solid silica thereto, in the amount of 1-3 per cent by weight of silica, whereby the latter reacts with and dissolves in the liquid caustic soda, and then distributing the resultant liquid mass in thin cross-section on a cooled surface to solidify said mass in its entirety before separate precipitation of a caustic soda-silica reaction product.

3. The method of making silicated caustic alkali product, consisting in the steps of adding a minor proportion of an alkali metal salt to caustic alkali maintained at a temperature substantially above its melting point, said alkali metal salt being incapable of forming a precipitate with said caustic alkali, and then adding finely divided, solid silica to such mixture in the proportion of 1-3 per cent by weight of the silica, the temperature of said molten prior to said silica addition being capable of imparting sufficient sensible heat together with the heat of the caustic alkali-silica reaction, to maintain the temperature at or above the melting point of the final silicated caustic product, and then rapidly solidifying the resultant liquid product in its entirety by cooling in thin cross-section and before separate precipitation of a caustic alkali-silica reaction product.

4. The method of making silicated caustic alkali products, consisting in the steps of heating anhydrous caustic soda to a temperature of at least 390° C., adding a minor proportion of salts thereto selected from the grop of sodium sulphate, sodium carbonate, borax, and the sodium phosphates, then adding finely divided, solid silica to such mixture, whereby the latter reacts with and dissolves in the liquid caustic soda, said silica being added in the proportion of 1-3 per cent by weight of silica, and then rapidly solidifying the resultant liquid product in its entirety by cooling in thin cross-section and before separate precipitation of a caustic soda-silica reaction product.

5. The method of making silicated caustic alkali products, consisting in the steps of heating anhydrous caustic soda to at least 390° C., flowing said molten caustic alkali onto a continuously moving cooled surface to produce solidification thereof in thin cross-section, and during the course of such flow, entraining in the liquid body a proportion of finely divided, solid silica in the amount of approximately 1-3 per cent by weight of silica and regulating the rate of flow of said caustic alkali therein so as to produce a complete dissolution of the silica in the liquid caustic alkali prior to such solidification, the time of contact of said silica with said liquid caustic alkali between the point of initial entrainment and the point of solidification being not over one minute thus preventing precipitation of a caustic soda-silica reaction product.

6. The method of making silicated caustic alkali products, consisting in the steps of heating anhydrous caustic soda to a temperature of at least 390° C., flowing such liquid caustic soda, and during the course of such flow, entraining therein finely divided, solid silica in the proportion of 1-3 per cent by weight of silica, whereby a sodium silicate is formed in the caustic, rapidly flowing such liquid onto a moving cooled surface to produce solidification thereof in thin cross-section and regulating the rate of flow of said caustic soda so that the time elapsed between the point of initial entrainment of said silica and the point of such solidification, is not over one minute thus preventing precipitation of a caustic soda-silica reaction product.

7. In the method of making silicated caustic products, consisting in the steps of heating anhydrous caustic soda to a temperature of at least 390° C., adding 2-6% by weight of sodium sulfate to the molten caustic soda and then adding finely divided, solid silica to the mixture, whereby the latter reacts with and dissolves in the liquid caustic soda, said silica being added in the proportion of 1-3 per cent by weight, and then rapidly solidifying the resultant liquid mass in its entirety by cooling in thin cross-section and before separate precipitation of a caustic soda silica-reaction product.

BRAZIER K. BEECHER.
HOWARD F. RODERICK.